June 3, 1969 — G. J. WASKO — 3,447,180
WIRE STRIPPING TOOL
Filed Sept. 13, 1965

INVENTOR.
GEORGE J. WASKO
BY
Braddock & Burd
ATTORNEYS

United States Patent Office 3,447,180
Patented June 3, 1969

3,447,180
WIRE STRIPPING TOOL
George J. Wasko, Rte. 2, Lakefield, Minn. 56150
Filed Sept. 13, 1965, Ser. No. 486,960
Int. Cl. B08b 1/04; B23d 79/04, 79/10
U.S. Cl. 15—93        10 Claims

ABSTRACT OF THE DISCLOSURE

A tool held in a chuck of a drill for removing coating from an end portion of a coated wire. The tool is a one-piece metal member having a shank integral with a cylindrical body. A uniform diameter axial bore extends into the body. A pair of longitudinal slots extend diametrically across the body through the bore. The slots have substantially parallel side walls spaced circumferentially a distance less than the diameter of the bore whereby each side wall has a longitudinal cutting edge operable to remove the coating from the wire.

---

This invention relates to a tool for removing coating from a coated wire and more particularly to a power driven rotating tool and method for stripping end portions of an enamel coated copper wire used in the winding of electric motors, electric generators and the like.

It is the object of the invention to provide an improved tool for removing the coating from an end portion of a coated wire.

A further object of the invention is to provide a tool having a plurality of longitudinally disposed cutting edges for stripping an equal length of coating from wires without the use of a separate gauge.

Still a further object of the invention is to provide a tool for removing coating from a coated wire which in use is self-cleaning.

An additional object of the invention is to provide a rugged and unitary tool for removing the coating from an end portion of a coated wire which is economical in cost, relatively simple and economical in construction, and reliable and efficient in use.

These and other objects of this invention will become readily apparent upon reference to the following detailed description and accompanying drawings wherein.

Figure 1:
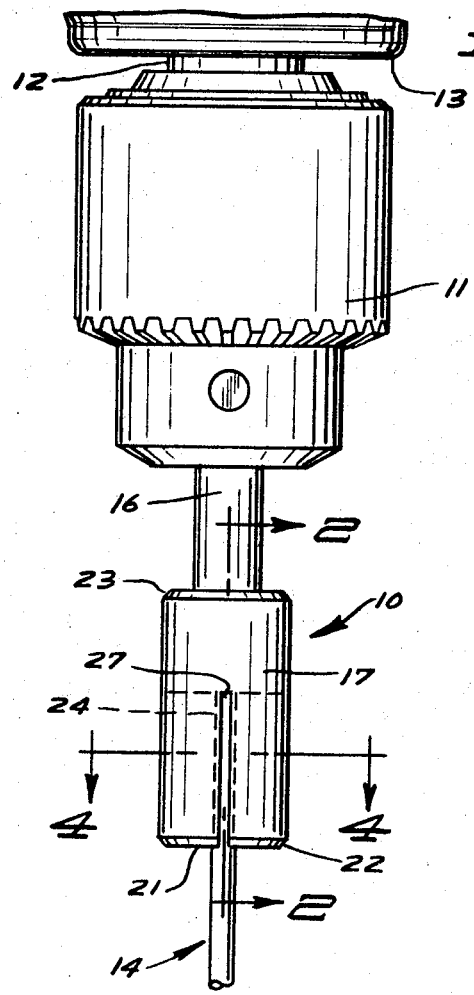
FIGURE 1 is an enlarged elevational view of the tool of this invention in assembled relation in a chuck of a power drive unit showing the coated wire inserted in the tool.

Referring to the drawings there is shown in FIGURE 1 the tool of this invention indicated generally at 10 mounted in a chuck 11. The conventional chuck 11 is connected to a drive shaft 12 of a power drive unit 13, such as a portable electric drill. The tool 10 projects from the chuck 11 and is rotated with the chuck 11 on operation of the power drive unit 13. The rotating tool 10 is used to remove a hard coating, such as enamel or similar insulating material, from an end portion of a coated wire 14. For example, the coated wire may be the enamel coated copper wire used in the windings of electric motors and electric generators.

The tool 10 is a one-piece member comprising a cylindrical shank 16 integrally joined to a cylindrical body 17. The shank 16 has a diameter of approximately one-half the diameter of the body 17. For example, the shank 16 may have a one-half inch diameter mounted in a correspondingly sized chuck 11. The shank and body are substantially equal in length and are positioned in end-to-end relative relation so as to have a common longitudinal axis of rotation. The upper end 18 of the shank 16 is flat and has a chamfered peripheral edge 19.

Figure 2:
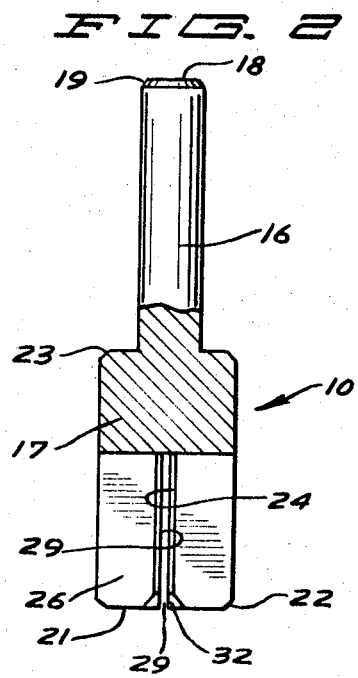
FIGURE 2 is a sectional view taken along the line 2—2 of FIGURE 1 with the wire removed from the tool.
Figure 3:
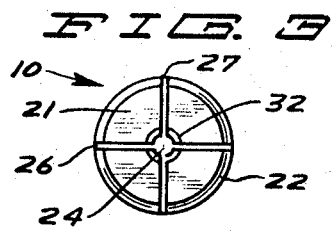
FIGURE 3 is an end view of the wire receiving end of the tool of FIGURE 2.

The body 17 has a flat lower face or end 21 extended to a chamfered peripheral edge 22. The shank end of the body has a similar chamfered peripheral edge 23. As shown in FIGURES 2 and 3, a bore 24 extends upwardly into the body 17 along the longitudinal axis. The bore 24 opens centrally of the end 21 and extends up into the body over one-half the length of the body. The depth of the bore 24 determines the length of the uncoated end portion of the wire. The diameter of the bore 24 is substantially equal to the diameter of the uncoated wire. A change in the diameter of the uncoated wire necessitates the use of a tool having a bore with a diameter equal to the diameter of the uncoated wire.

Figure 4:
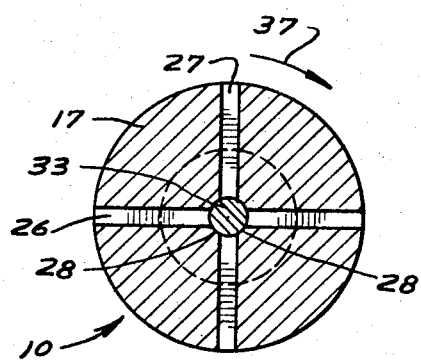
FIGURE 4 is an enlarged sectional view taken along the line 4—4 of FIGURE 1.

As shown in FIGURE 4, the body 17 has a pair of diametrical slots 26 and 27 positioned in normally disposed planes. The slots 26 and 27 are spaced 90 degrees from each other, intersect at the axis of the bore 24, and extended longitudinally of the body terminating at the forward end of the bore 24. The diameter of the bore 24 is larger than the width of the slots 26 and 27.

Figure 5:
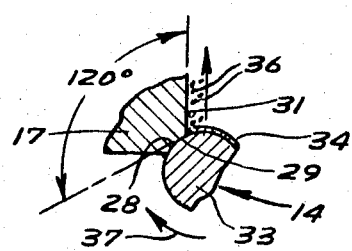
FIGURE 5 is a diagrammatic view in section illustrating the cutting action of the tool on the coating secured to the periphery of the wire.

In the embodiment shown in FIGURE 4, the slots 26 and 27 have a width which is about one-half the diameter of the bore 24. This relationship between the size of the bore 24 and slots 26 and 27 provides the bore with a plurality of arcuate wall sectors 28 terminating at the slots 26 and 27 in longitudinal cutting edges 29. As shown in FIGURE 5, the angle between the tangent to the bore 24 at the cutting edge 29 and adjacent wall 31 of the slot 27 is 120 degrees. This angle varies between 90° and 180° with the size relationship between the diameter of the bore 24 and the width of the slots 26 and 27.

As shown in FIGURES 2 and 3, the lower end 21 of the body has a conical recess 32 concentric with the bore 24. The recess 32 is formed by tapered walls which in use guides the end of the coated wire 14 into the bore 24.

As shown in FIGURE 5, the coated wire 14 has a solid wire core 33, such as a copper wire, having a coating 34. As the coated wire 14 is moved up into the bore 24 of tool 10 it is held to prevent rotation thereof so that the cutting edges 29 strip or peel the coating 34 from the peripheral surface of the wire 33. The removed coating 36 is broken into relatively small particles which flow radially outwardly through the slots 26 and 27, under the influence of the centrifugal force established by the rotating tool. As shown in FIGURES 4 and 5, the tool rotates in the direction of the arrow 37 whereby the cutting edges 29 move into the coating 34 to breakup the coating on the end section of the wire 33. As best shown in FIGURE 1, the coated wire 14 is fed into the tool until the forward end of the wire abuts the bottom of the bore so that a determined length of the wire has the coating removed therefrom.

In use, with the tool 10 mounted in the chuck 11 and the power drive unit 13 actuated, the tool rotates at a relatively high rate of speed. The end of the coated wire is positioned in the conical recess 32 and moved into the bore 24. The plurality of cutting edges 29 progressively remove the coating 34 from the end of the wire during movement of the wire into the bore 24 of the body 17. When the end of the wire 33 abuts the bottom of the bore 24 the wire is withdrawn from the tool 10.

In terms of the method for removing the coating from an end portion of a coated wire 14 the invention comprises the steps of rotating the tool 10 in a direction so that the cutting edges 29 move in a circular path having a diameter substantially equal to the diameter of the uncoated wire. The uncoated wire is then guided into cutting engagement with the cutting edges 29 to axially align the wire with the axis of rotation of the tool 10. As the wire is progressively moved into the tool the coating is progressively removed and discharged radially by reason of the centrifugal force established by the rapid rotation of the tool. The wire 14 is moved axially into the tool until it abuts the bottom of the bore 24 and is then withdrawn from the tool.

While there have been shown, described and pointed out the fundamental novel features and methods of the invention as applied to the preferred embodiment, it should be understood that various omissions, substitutions, changes in form, and details of the apparatus and method illustrated may be made by those skilled in the art, without departing from the spirit of the invention. It is intended to be limited only as indicated by the scope of the following claims.

The embodiments of the invention in which an exclusive property and privilege is claimed are defined as follows:

1. A tool for removing the coating from an end portion of a coated wire comprising a shank having a longitudinal axis, and a body secured to one end of the shank, said body having a bore extended along said longitudinal axis, the diameter of the bore being substantially equal to the diameter of the uncoated wire, and at least one longitudinal slot open to said bore and the periphery of the body each slot having substantially parallel side walls spaced apart a circumferential distance smaller than the diameter of a bore, said side walls having at least one longitudinal cutting edge whereby when the coated wire is inserted into the bore in the rotated body the cutting edge removes the coating from the wire, said removed coating flowing outwardly through said slot.

2. The tool defined in claim 1 wherein said body includes means for guiding the coated wire into said bore.

3. The tool of claim 1 wherein the parallel side walls are spaced apart a circumferential distance approximately one-half the diameter of the bore.

4. In a tool for removing coating from an end portion of a coated wire, a body having a longitudinal axis and an end wall, a bore extended along said longitudinal axis and open to said end wall, the diameter of the bore being substantially equal to the diameter of the uncoated wire and at least one longitudinal slot open to said bore and the periphery of said body each slot having substantially parallel side walls spaced apart a circumferential distance smaller than the diameter of a bore, said side walls having at least one longitudinal extended cutting edge whereby when the coated wire is inserted into the bore of the rotated body the cutting edge removes the coating from the wire, said removed coating flowing outwardly through said slot.

5. The tool of claim 4 wherein the parallel side walls are spaced apart a circumferential distance approximately one-half the diameter of the bore.

6. A tool for removing the coating from an end portion of a coated wire comprising a shank having a longitudinal axis, said shank rotatable about said axis, a body having a first end secured to one end of said shank and a second end extended substantially normal to said longitudinal axis, said body including a bore open to said second end and extended axially into said body along said longitudinal axis, said bore having a uniform diameter substantially equal to the diameter of the uncoated wire and a pair of longitudinal slots extended diametrically across said body in normally disposed planes, said slots open to said bore and the periphery of said body each slot having substantially parallel side walls spaced apart a circumferential distance smaller than the diameter of said bore, said side walls having circumferentially spaced longitudinal cutting edges whereby when the coated wire is inserted into the bore of the rotated body the cutting edges remove the coating from the wire, said removed coating flowing outwardly through said slots.

7. The tool of claim 6 wherein the parallel side walls are spaced apart a circumferential distance approximately one-half the diameter of the bore.

8. A tool for removing the coating from an end portion of a coated wire comprising: a cylindrical shank having a longitudinal axis, said shank rotatable about said axis, a cylindrical body having a first end integral with one end of said shank and a second end extended substantially normal to said longitudinal axis, said body having a diameter which is larger than the diameter of the shank and an axial bore open to said second end and extended into said body along said longitudinal axis, said bore having a uniform diameter substantially equal to the diameter of the uncoated wire, a pair of longitudinal slots extended diametrically across said body in normally disposed planes, said slots open to said bore and the periphery of said body, each slot having substantially parallel side walls spaced apart a circumferential distance approximately one-half the diameter of the bore, said side walls having circumferentially spaced longitudinal cutting edges, and a conical shaped recess in said second end about said bore for guiding the end of the coated wire into said bore whereby the cutting edges remove the coating from the wire as the wire is inserted into the bore, said removed coating flowing outwardly through said slots.

9. A tool for removing the coating from an end portion of a coated wire comprising: a body having a longitudinal axis and an end wall extended substantially normal to said longitudinal axis, said body having an axial bore open to said end wall and extended into said body along said longitudinal axis, said bore having a uniform diameter substantially equal to the diameter of the uncoated wire, a plurality of longitudinal slots extended diametrically across said body, said slots open to said bore and the periphery of said body each slot having substantially parallel side walls spaced apart a circumferential distance smaller than the diameter of a bore, said side walls having a least one circumferentially spaced longitudinal cutting edges whereby when the coated wire is inserted into the bore of the rotated body the cutting edges remove the coating from the wire, said removed coating flowing outwardly through said slot.

10. The tool of claim 9 wherein the parallel side walls are spaced apart a circumferential distance approximately one-half the diameter of the bore.

References Cited
UNITED STATES PATENTS

| | | |
|---|---|---|
| 1,981,721 | 11/1934 | Crittenden et al. _ 15—104.04 XR |
| 2,126,476 | 8/1938 | Koonz. |
| 2,286,931 | 6/1942 | Radeke _____ 134—6 XR |
| 2,452,423 | 10/1948 | Bass _____ 15—93 XR |
| 2,473,654 | 6/1949 | Loeser et al. ___ 15—104.04 XR |
| 2,530,219 | 11/1950 | Bartusek _____ 15—93 XR |
| 2,624,897 | 1/1953 | Black et al. |

MORRIS O. WOLK, Primary Examiner.

JOSEPH T. ZATARGA, Assistant Examiner.

U.S. Cl. X.R.

15—104.04; 134—6, 9